July 15, 1958

R. P. DAVIS 2,842,816

MOLD FORMING APPARATUS

Filed April 30, 1954

INVENTOR.
Ralph P. Davis.
BY
Albert J. Henderson
HIS ATTORNEY

July 15, 1958     R. P. DAVIS     2,842,816
MOLD FORMING APPARATUS Filed April 30, 1954     8 Sheets-Sheet 3

Fig. 3.

INVENTOR.
Ralph P. Davis
BY
HIS ATTORNEY

July 15, 1958  R. P. DAVIS  2,842,816
MOLD FORMING APPARATUS
Filed April 30, 1954  8 Sheets-Sheet 4

INVENTOR.
Ralph P. Davis
BY
HIS ATTORNEY

INVENTOR.
Ralph P. Davis
BY
HIS ATTORNEY

July 15, 1958   R. P. DAVIS   2,842,816
MOLD FORMING APPARATUS
Filed April 30, 1954   8 Sheets-Sheet 8

INVENTOR.
Ralph P. Davis
BY
HIS ATTORNEY

United States Patent Office 2,842,816
Patented July 15, 1958

2,842,816

MOLD FORMING APPARATUS

Ralph P. Davis, Squantum, Mass., assignor to Walworth Company, Boston, Mass., a corporation of Massachusetts Application April 30, 1954, Serial No. 426,661

13 Claims. (Cl. 22—32)

This invention relates to mold forming apparatus and more particularly to apparatus for producing foundry molds in shell form from a molding mixture comprising refractory material and synthetic resin binder.

Apparatus of this type has heretofore included a rotatable hopper for mold forming material having an open end and a pattern carrier engageable with the open end of the hopper. The pattern carrier positioned a pattern for registry with the interior of the hopper for the purpose of investing the pattern with mold forming material from the hopper. With such devices, the pattern carrier was first moved into engagement with the hopper and clamped thereto. The assembly of hopper and pattern carrier was then inverted and subsequently returned to its initial position where the pattern carrier was removed from the hopper.

It is an object of this invention to reduce the time required to complete the pattern investing cycle and therefore increase the productivity of this type of machine. It is a further object to effect such increased productivity by simultaneously actuating the pattern carrier and hopper to move the pattern carrier into and out of engagement with the hopper while the same is being rotated.

Another object of this invention is to effect increased productivity in machines of this type by continuously heating the pattern plate to accelerate fusion and curing of the resin, preferably by maintaining a flame adjacent the pattern plate at all times.

Another object of this invention is to assure uniform deposition of mold forming material on a pattern by leveling the material in the hopper before it is dropped onto the pattern.

Another object of this invention is to assure uniform distribution of mold forming material on a pattern plate through the utilization of a gate mechanism in the hopper which will provide a plurality of apertures in its open position and which will operate in a minimum span of time. A preferred embodiment of such a gate comprises a plurality of expansible and collapsible tubular elements traversing the interior of the hopper and adapted to be connected to a source of fluid pressure. Admission of fluid pressure to the interior of the tubular elements will cause the same to expand and contact each other thereby providing a substantially imperforate gate while release of the fluid pressure will cause collapse of the tubular elements and provide a plurality of apertures through which mold forming material may fall.

Another object of this invention is to prevent return of agglomerated particles of mold forming material to the main supply of molding material in the hopper. To this end, a screen is provided in the hopper for cooperation with a port in the side of the hopper through which solids rejected by the screen may be ejected from the interior of the hopper.

Another object of this invention is to assure uniform deposition of mold forming material on the pattern by preventing the trapping of air beneath falling mold forming material. To this end, exhaust means is provided for removing air from the area immediately above the pattern plate and returning the same to the interior of the hopper above the falling mold forming material.

In a preferred embodiment of the invention, a hopper for mold forming material is pivotally mounted on a suitable support and is provided with a discharge opening at one end thereof. Pattern support means is mounted on the hopper for bodily movement therewith and for rotational movement relative thereto. Actuating means is provided for moving the pattern support relative to the hopper into and out of engagement with the open end thereof in response to rotational movement of the hopper, and means is provided for permitting operation of the pattern support driving mechanism only while the hopper is moving through a predetermined portion of its total range of movement.

Other objects and advantages will appear from the following specification taken in connection with the accompanying drawings wherein.

Referring more particularly to the drawings, the mold forming apparatus is here shown as comprising support means including a flat rectangular base 10 having spaced parallel side frames 12, 13 extending upwardly from each side thereof. A hopper 14 is positioned between the side frames 12, 13 and pivotally mounted thereon. Also positioned between the side frames 12, 13 is a mold ejection mechanism 16. Slidable oven means 18 is positioned above the ejection mechanism 16.

The hopper 14 comprises a box-like structure open at one end 20, the open end 20 providing a charging and discharge opening through which mold forming material may be passed. A housing 22 encompasses the hopper 14 adjacent the open end 20 thereof and provides passage means through which refrigeration coils 23 are strung to prevent overheating of the hopper 14. The hopper 14 is provided with a pair of oppositely disposed trunnions 24, 25 which are respectively journaled in bearings 26 carried on the side frames 12, 13. Passages 21 are formed in each trunnion 24, 25 and are connected to the coils 23 through conduits 27. The passages 21 also communicate with a compressor 29 through suitable slip ring fittings 31 and conduits 33 to provide for circulation of refrigerant.

Means is provided for oscillating the hopper 14 about the axis of the trunnions 24, 25. This means takes the form of a sprocket 28 secured to the outer end of the trunnion 24 to rotate therewith and adapted to mesh with a suitable drive chain 30. One end of the drive chain 30 is connected to the piston rod 32 of a fluid pressure operated motor 34 and the other end of the chain 30 is connected to the piston rod 36 of a fluid pressure operated motor 38. The motors 34, 38 are secured to the side frame 12 so that reciprocation of the piston rods 32, 36 will effect oscillation of the sprocket 28, trunnion 24 and hopper 14.

A pattern support frame 40, which is adapted to carry a pattern 42 thereon, is secured to the hopper 14 to be movable bodily therewith and to be rotatable relative thereto. More particularly, the pattern support frame 40 is secured to a hollow rotatable shaft 44 which is journaled in a pair of spaced bearings 46 mounted on the hopper 14 for movement therewith. The rotatable shaft 44 is so positioned relative to the hopper 14 that rotation of the pattern frame 40 about the axis thereof will position the pattern 42 in registry with the open end 20 of the hopper 14.

Figure 5:
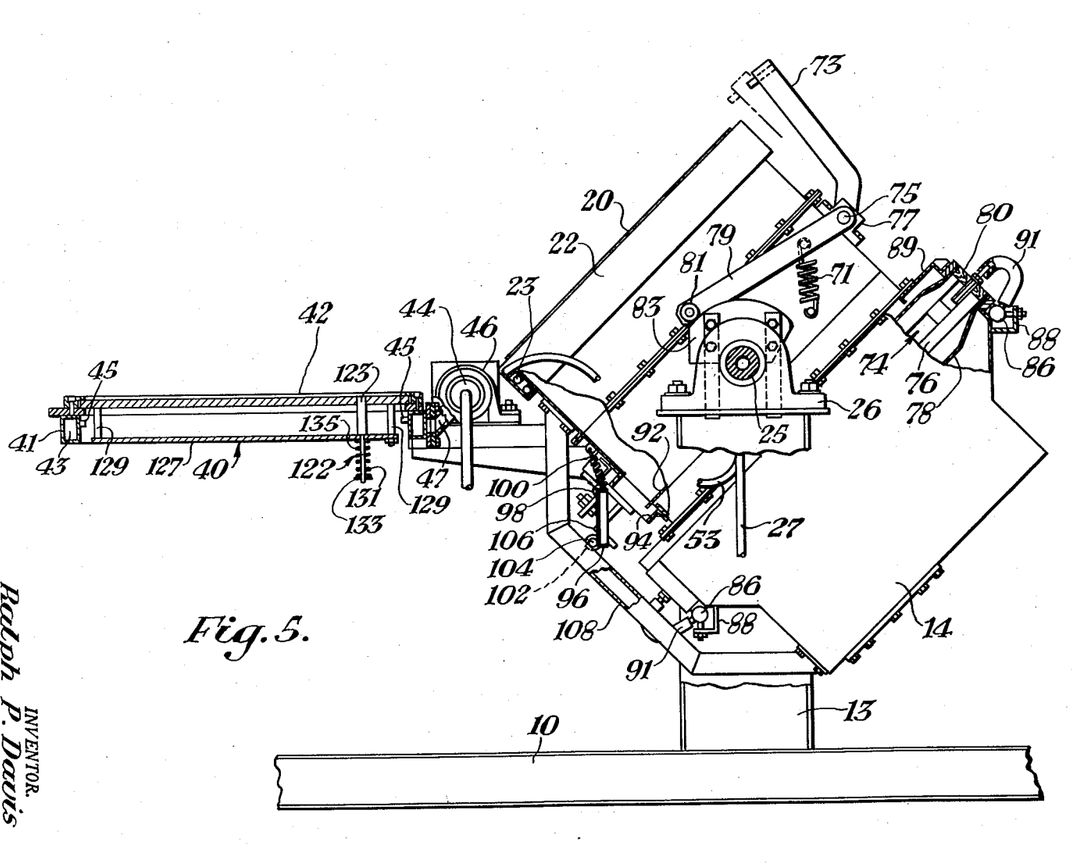
Fig. 5 is a sectional view taken on the line V—V of Fig. 4.
Figure 6:
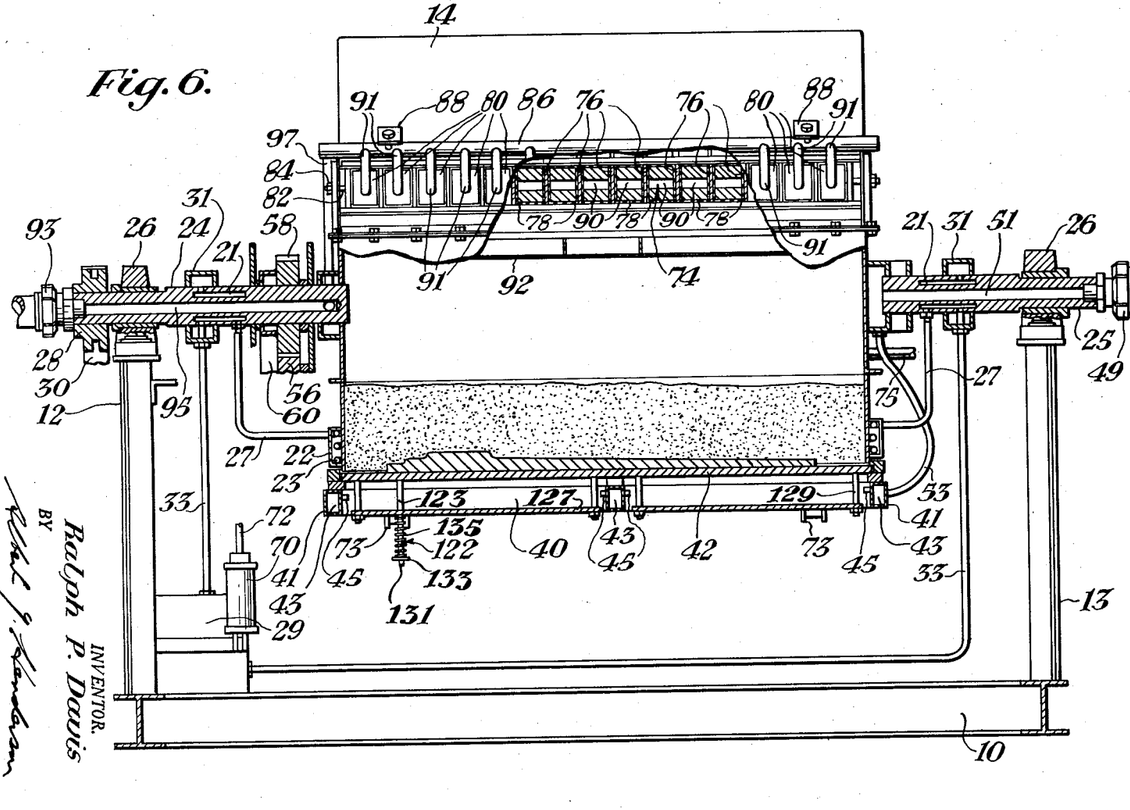
Fig. 6 is a sectional view with portions thereof omitted taken on the line VI—VI of Fig. 1 but showing the parts of the apparatus in different operating positions.

As best shown in Figs. 5 and 6, the pattern support frame 40 comprises a generally rectangular member 41 which is hollow and defines a generally rectangular gas passage 43. A plurality of spaced burner means in the form of orifice fittings 45 are carried on the inner wall of the hollow support member 41 and communicate with the gas passage 43 to direct streams of gaseous fuel toward the center of the pattern support frame 40 and maintain a sheet of flame beneath the pattern plate 42 at all times.

Gaseous fuel is supplied to the passage 43 through a plurality of conduits 47 (only one of which is shown) which are secured to the hollow support element 41 and to the hollow shaft 44 to communicate with the interior of each. Gaseous fuel is supplied to the interior of the hollow shaft 44 through a suitable pivotal fitting 49 carried on the end of the trunnion 25 and connected to a source of fuel (not shown), an axial passage 51 formed in the trunnion 25 and communicating with the fitting 49, and a flexible conduit 53 communicating with the passage 51 in the trunnion 25 and connected to the end of the hollow shaft 44.

With this arrangement, a flame may be maintained beneath the pattern plate 42 at all times to assure rapid fusion of the resin binder when the molding mixture is deposited thereon as well as partial curing of the shell mold as the apparatus moves through various steps of the operating cycle to be described hereinafter. It will be apparent that maintenance of the pattern plate 42 at a relatively high temperature at all times will eliminate the necessity of stopping the production cycle of the machine at any time in order to preheat the pattern plate. Thus, continuous production of shell molds is assured.

It is an important feature of this invention that rotational movement of the pattern support frame 40 about the axis of the shaft 44 takes place during oscillatory movement of the hopper 14 about the axis of the trunnions 24, 25 with the angular velocity of the pattern support frame being greater than that of the hopper 14. To effect such movement of the pattern support frame 40, means is provided for rotating the same about the axis of the shaft 44 in response to pivotal movement of the hopper 14. This means comprises a sprocket 48 secured to one end of the shaft 44 to be rotatable therewith and meshing with a suitable endless drive chain 50 which also meshes with a sprocket 52. The sprocket 52 is rotatably mounted upon an arbor 54 and is secured to a gear wheel 56 which is also mounted upon the arbor 54 for rotation thereon. The arbor 54 is secured to the hopper 14 for movement therewith and extends parallel to the axis of the trunnion 24. A second gear 58 meshes with the gear 56 and is rotatably mounted on the trunnion 24.

The gear 58 is normally free to rotate with the trunnion 24, however, latching means is provided for restraining such movement of the gear 58 while the hopper 14 is moving through a selected portion of its range of movement. The latching means comprises a lever 60 secured at one end to the gear 58 and carrying a latching pin 62 at its other end. A second lever 64 is pivoted at one end on the side frame 12 and is connected at its other end to a spring 66 which cooperates with the side frame 12 to bias the lever 64 into engagement with the latching pin 62.

Formed in a medial portion of the lever 64 is a notch 68 adapted to receive the latching pin 62. Thus, when the pin 62 is positioned in the notch 68 of the lever 64, rotational movement of the lever 60 and gear 58 is prevented and the gear 58 is effectively latched. However, the above described latching means will release the gear 58 upon operation of a fluid pressure operated motor 70 which is pivoted on the base 10 and provided with a piston rod 72 connected to the lever 64. In operation, actuation of the piston rod 72 will move the lever 64 against the bias of the spring 66 freeing the pin 62 from the notch 68.

It will be apparent from the foregoing that the gears 56, 58 form planetary gearing when the latching pin 62 is positioned in the notch 68 of the lever 64 to prevent rotation of the gear 58, the gear 58 being the sun gear and the gear 56 being the follower. Thus, when the gear 58 is latched and prevented from rotating, rotation of the hopper 14 about the axis of the trunnions 24, 25 will swing the arbor 54 about the axis of the trunnions and cause the follower gear 56 to rotate about the sun gear 58. Rotation of the follower gear 56 will be transmitted to the sprocket 48 through the drive chain 50 to cause pivotal movement of the pattern support frame 40 relative to the hopper 14 to move the pattern 42 into and out of operative engagement with the open end 20 of the hopper 14. Preferably, the gearing is selected to move the pattern support frame 40 about its axis faster than the hopper 14 moves about the axis of the trunnions 24, 25.

A clamping device is provided for securing the pattern support frame 40 to the open end 20 of the hopper 14 when the same are moved into engagement with each other. The clamping device comprises a pair of spaced clamping arms 73 secured to a shaft 75 which is rotatably mounted in a pair of bearings 77 secured to the outer surface of a side wall of the hopper 14. One end of the shaft 75 extends outboard of the hopper 14 and is secured to one end of a lever 79. A spring 71 acting between the hopper and the lever 79 biases the lever 79 in a counterclockwise direction, as viewed in Fig. 5, to urge the clamping arms into clamping engagement with the pattern support frame 40. The other end of the lever 79 carries a cam follower 81 which is engageable with a cam 83 secured to the side frame 13.

Since the shaft 75 is mounted on the hopper 14 for movement therewith, rotation of the hopper 14 about the axis of the trunnions 24, 25 will move the cam follower 81 into engagement with the cam 83 and along the same to cause rotation of the shaft 75 and a swinging movement of the clamping arms 73 during a portion of the range of movement of the hopper 14. The configuration of the cam 83 is such that the clamping arms 73 will be permitted to move into clamping engagement with the pattern support frame 40 immediately after the same is brought into engagement with the open end 20 of the hopper 14. The pattern support frame 40 is thus automatically clamped to the hopper 14 in response to movement of the hopper to a predetermined position.

Figure 4:
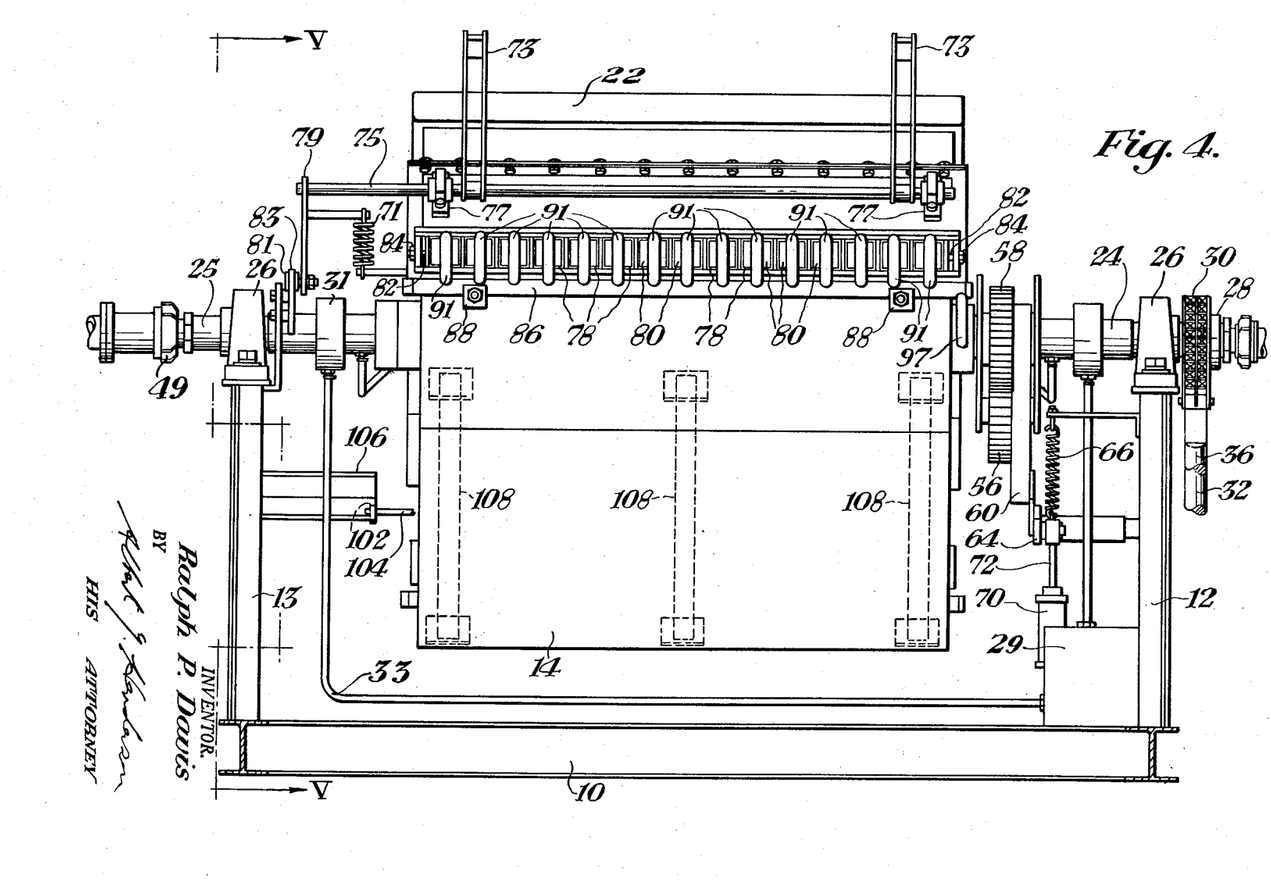
Fig. 4 is an end view of the apparatus with portions thereof omitted taken on the line IV—IV of Fig. 1.

As best shown in Figs. 4, 5 and 6, a gate 74 is mounted within the hopper 14 and extends transversely across the interior thereof. The gate 74 comprises a plurality of spaced, parallel plates or blades 76 extending across the interior of the hopper and supported on opposite walls thereof. Encompassing each of the blades 76 is an expansible and collapsible, normally tubular, element 78 formed of a relatively flexible material which may also be elastic, if desired. The ends of the expansible tubular elements 78 are securely clamped to the blades 76 by a plurality of wooden blocks 80 respectively positioned between the end portions of adjacent pairs of blades 76 and clamped together as a unit by a suitable stud 82 extending therethrough with a nut 84 threaded on each end thereof.

The interior of each tubular expansible element 78 is adapted to be placed in communication with a source of fluid under pressure (not shown) by a pair of manifolds 86 which are secured to the hopper 14 adjacent the blocks 80 by means of a plurality of suitable clamps 88. Suitable passages 90 formed in the blocks 80 communicate with the interiors of the expansible tubular elements 78 and are connected to the manifolds 86 through a plurality of flexible tubes 91. Thus, when the manifolds 86 are connected with a source of fluid under pressure, pressurized fluid enters the interiors of the expansible tubular elements 78 causing the same to expand, each element 78 contacting an adjacent pair of expanded elements 78 to provide a substantially imperforate wall traversing the interior of the hopper 14.

Since the end portions of the tubular elements 78 are clamped tightly between the blocks 80, the portions of the tubular elements adjacent the blocks 80 will be prevented from assuming a circular cross section. This will result in a plurality of substantially triangular apertures being formed between the tubular elements 78 immediately adjacent the blocks 80 when the tubular elements 78 are in their expanded condition. To prevent molding material from dropping through these apertures onto the pattern plate, the side wall of the hopper 14 is offset adjacent the blocks 80 to form a shelf 89 between the gate 74 and the open end 20 of the hopper 14. One of the shelves 89 is shown in Fig. 5.

Means is provided for connecting the manifolds 86 with a source of fluid under pressure. As best shown in Fig. 6, this means comprises a suitable swivel fitting 93 adapted to be connected to a source of fluid under pressure (not shown) and carried on the end of the trunnion 24 to communicate with an axially extending passage 95 formed in the trunnion 24. The passage 95 communicates with a pair of conduits 97 secured to the side wall of the hopper 14 and connected to the manifolds 86 respectively.

When the manifolds 86 are disconnected from the source of fluid under pressure, the expansible tubular elements 78 will collapse, restoring the spacing therebetween and providing a plurality of parallel passages for the flow of molding material from one end of the hopper 14 to the other. Preferably, the manifolds 86 are connected to a vacuum pump simultaneously with their separation from the source of fluid pressure so that collapse of the expansible elements 78 will be accelerated and the gate 74 will move from closed to open position with a snap action.

Positioned between the gate 74 and the open end 20 of the hopper 14 is screen means in the form of a transversely extending screen 92 adapted to be vibrated by suitable motor means (not shown). Immediately adjacent one end of the screen 92 is a port 94 formed in a side wall of the hopper 14 and adapted to be closed by a swinging door 96. The door 96 is hinged along its upper edge at 98 and is biased toward the closed position by a tension spring 100 connected thereto and to the wall of the hopper 14.

Cam means is provided for opening the door 96 against the bias of the spring 100 when the flask 14 is positioned to place the pattern support frame 40 adjacent the ejector mechanism 16 as shown in Fig. 5. In this position of the hopper 14, the longitudinal axis thereof is disposed at substantially 45 degrees to the vertical and a roller 102 carried on the end of a shaft 104 is in engagement with an abutment 106 carried on the side frame 13. The shaft 104 is secured to the lower end of the door 96 so that engagement of the roller 102 with the abutment 106 will restrain movement of the lower end of the door 96 when the hopper 14 is moving in a counterclockwise direction as viewed in Fig. 5. The abutment 106 is located to engage the roller 102 as the hopper 14 moves from a vertical position to the position shown in Fig. 5 as will be more fully brought out in a subsequent description of the operation of the apparatus.

As is customary in devices of this type, inversion of the hopper 14 results in movement of mold forming material from one end thereof to the other under the influence of gravity. The falling mass of molding material acts as a piston and traps substantial quantities of air beneath it. This often results in the air breaking through the mass of molding material at localized points to cause unequal distribution of molding material on the pattern plate. To avoid this difficulty and assure uniform distribution of molding material, exhaust means is provided for removing trapped air from the space adjacent the pattern plate as the molding material moves toward the same. To this end, passage means in the form of a plurality of conduits 108 are secured to the exterior of the hopper 14. One end of each conduit 108 is secured to the hopper 14 adjacent the bottom wall thereof and communicates with the interior of the hopper at this point. The other end of each conduit 108 is secured to the hopper 14 adjacent the coolant passage housing 22 and communicates with the interior of the hopper 14 at this point.

Thus, upon inversion of the hopper 14 and movement of mold forming material from the bottom wall thereof toward the open end 20, air is forced ahead of the falling mass of molding material and is exhausted through the conduits 108 to be bled back into the hopper above the mass of falling mold material. Since the falling mass of molding material creates a slight vacuum adjacent the bottom wall of the hopper 14, rapid exhausting of air from the space above the pattern plate 42 is assured.

The oven means 18 is positioned above the ejector mechanism 16 adjacent the path of the swinging pattern support frame 40 and comprises an oven housing 110 slidably mounted on a pair of suitable rails 112. The rails 112 extend radially of the axis of rotation of the pattern support frame 40 and are adapted to parallel the sides of the pattern support frame 40 when the same is in a position intermediate those positions in which it engages the hopper 14 and ejection mechanism 16 respectively. The oven housing 110 is provided with suitable heating elements, here shown as burners 114, for maintaining a predetermined temperature within the oven housing 110. Suitable means, here shown as a fluid pressure actuated motor 116, is provided for reciprocating the oven housing 110 on the tracks 112 and positioning the pattern support from 40 within the oven housing 110.

The ejection mechanism 16 comprises a reciprocable plate 118 arranged to be actuated by a fluid presure operated motor 120 which is supported on the base 10. The plate 118 is engageable with a plurality of ejector pins 122 (only two of which are shown) on the pattern 42 for ejecting a finished mold from the pattern 42. Each ejector pin 122 comprises a cylindrical portion 123 slidably mounted in a suitable aperture formed in the pattern plate 42 and normally seated on a closure plate 127 which is secured to the pattern plate 42 and held in spaced parallel relationship therewith by a plurality of studs 129. Each ejector pin 122 also includes a reduced end portion 131 which projects through a suitable aperture formed in the closure plate 127 and carries a spring seat 133. A spring 135 acts between the spring seat 133 and the closure plate 127 to bias the cylindrical portion 123 of the ejector pin 122 into engagement with the closure plate 127.

It will be apparent that the closure plate 127 performs the dual function of directing a flame emanating from the orifice fittings 45 into engagement with the bottom of the pattern plate 42 and also serves to shield the ejector pin biasing springs 135 from the deteriorating effect of the flame. Accordingly, heating of the pattern plate 42 is facilitated and the life of the springs 135 is prolonged. It is also to be noted that shielding of the springs 135 serves to prevent weakening thereof and thereby eliminates any tendency for the ejector pin 122 to slide through the pattern plate 42 and damage a mold during inversion of the pattern support means 40.

To assure positive ejection of a finished mold from the pattern plate 42, an abutment 124 is provided and is supported by the base 10 adjacent the ejector mechanism 16. The abutment 124 is positioned to provide a seat for the pattern support means 40 as the same moves into position above the ejector mechanism 16 and a suitable clamp 125 is provided for holding the pattern support means 40 firmly against the abutment 124 during the ejection operation.

Operation

Figure 1:
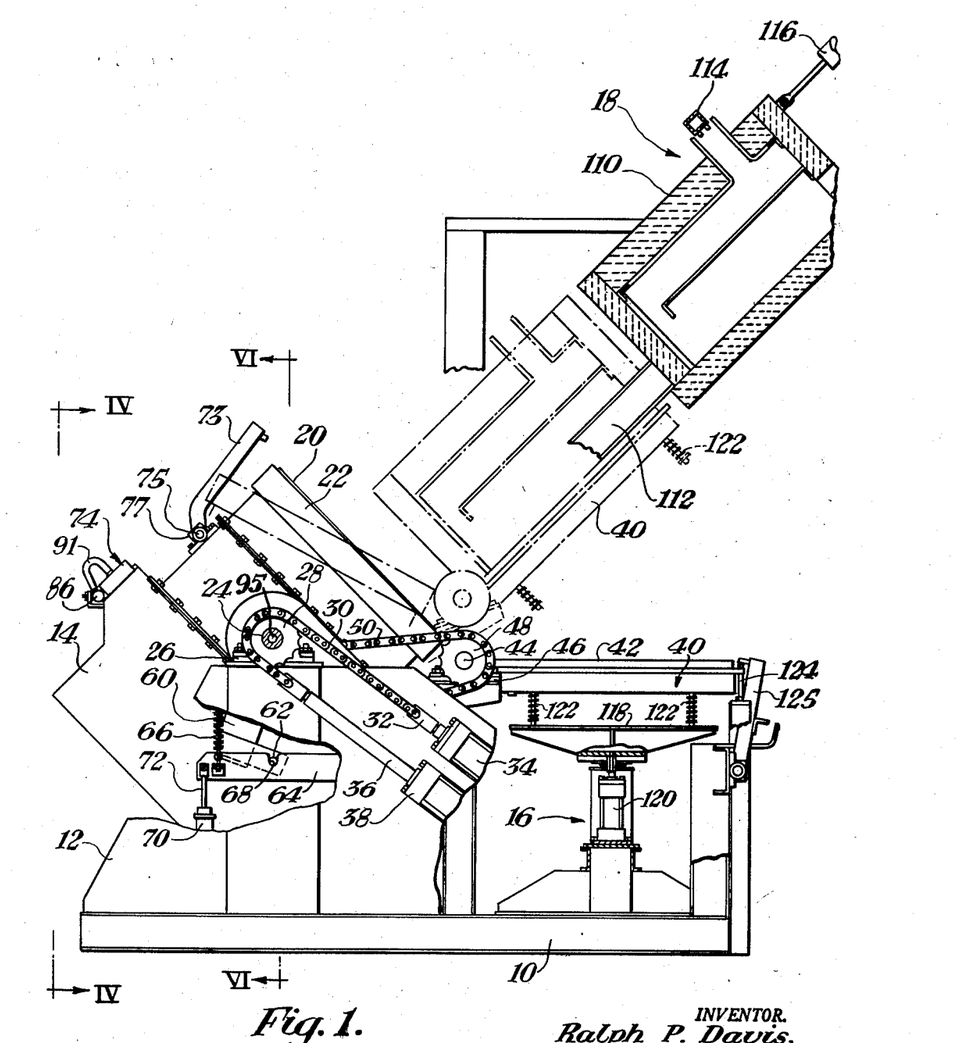
Fig. 1 is a side elevation of a mold forming apparatus embodying this invention with portions thereof broken away and other portions omitted.
Figure 2:
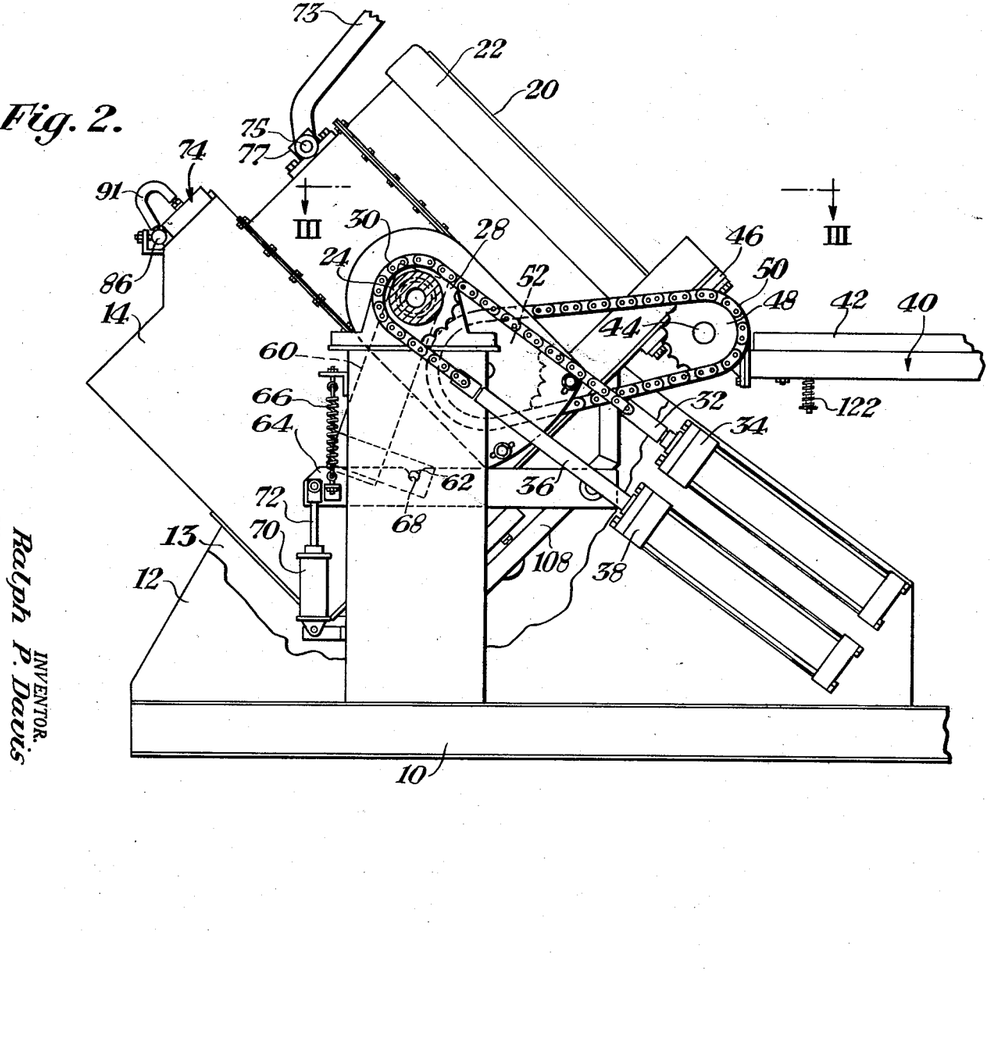
Fig. 2 is a fragmentary view similar to Fig. 1 with the foundation plates removed to show the mechanism more clearly.
Figure 3:
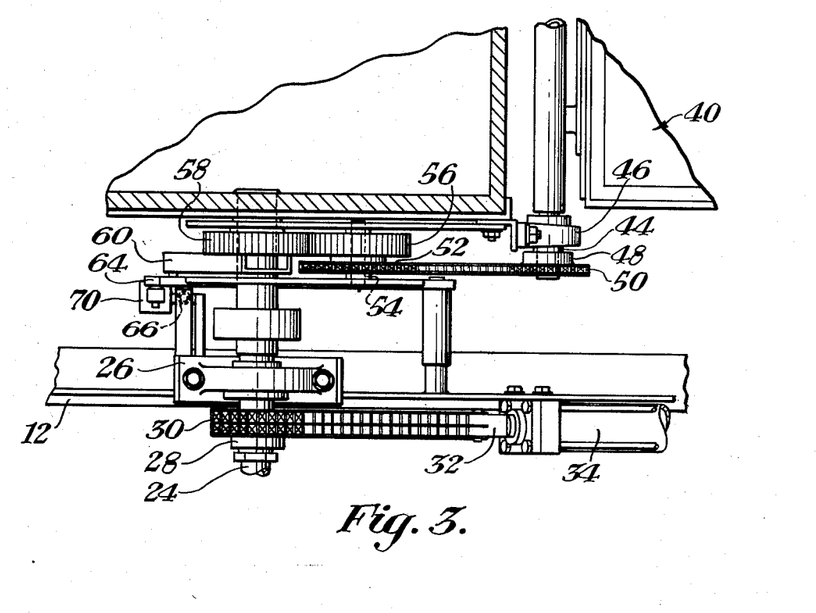
Fig. 3 is a fragmentary sectional view taken on the line III—III of Fig. 2.
Figure 7:
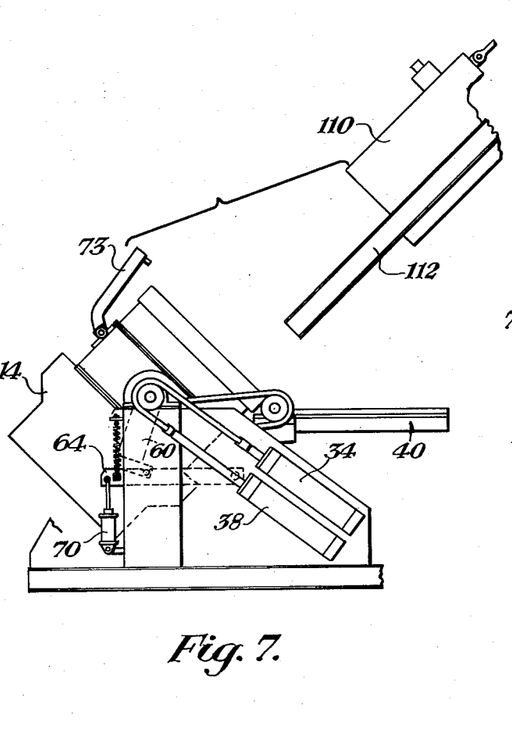
Fig. 7 is a side elevation of the apparatus at the starting position of a molding operation.

Assume that the various parts of the apparatus are in the positions shown in Figs. 1 and 7, having just completed a mold making cycle so that the pattern plate 42 is preheated and a quantity of mold forming material is disposed in the hopper 14 beneath the closed gate 74. Fluid under pressure is admitted to the fluid pressure motors 34, 38 in such a manner as to extend the piston rod 32 and retract the piston rod 36, causing counterclockwise rotation of the sprocket 28 and trunnion 24 with consequent counterclockwise rotation of the hopper 14 about the axis of the trunnions 24, 25.

Since the gear 58 is prevented from rotating by engagement of the latching pin 62 with the edges of the notch 68 of the lever 64, the gear 56 acts as a planetary gearing follower and causes counterclockwise rotation of the shaft 44 through the sprocket 52, chain 50 and sprocket 48. Counterclockwise rotation of the shaft 44 will swing the pattern support frame 40 and pattern 42 carried thereby into engagement with the open end 20 of the hopper. At this point in the rotation of the hopper 14, the cam follower 81 drops off the cam 83 to permit the spring 71 to swing the clamping arms in a clockwise direction and securely clamp the pattern support frame 40 to the hopper 14.

Figure 8:
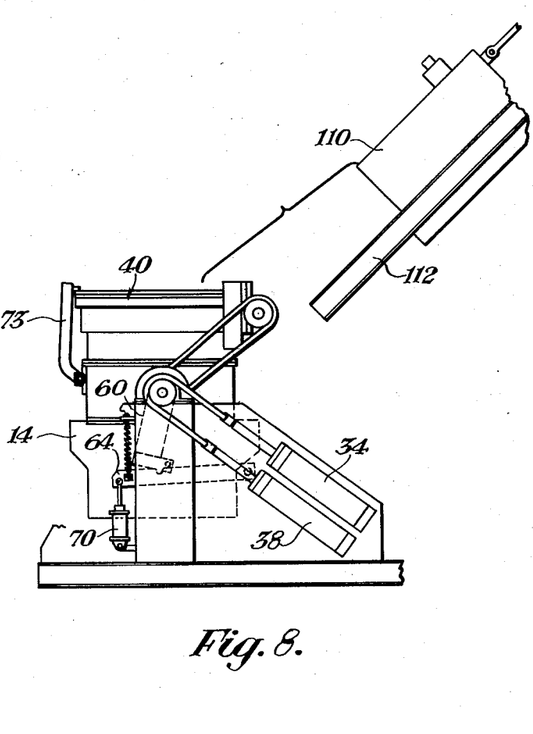
Fig. 8 is a side elevation showing the pattern holder in engagement with the hopper preparatory to inverting the hopper.

Immediately upon engagement of the open end 20 of the hopper 14 by the pattern support frame 40 and pattern plate 42, the fluid pressure motor 70 is actuated to rotate the latching lever 64 against the bias of the spring 66, thereby releasing the latching pin 62 from the notch 68 and releasing the gear 58 for rotation with the trunnion 24. Such release of the gear 58 terminates the planetary relationship of the gearing and torque is no longer transmitted to the shaft 44 upon further rotation of the hopper 14. At this point in the cycle, the various parts of the mechanism are positioned as shown in Fig. 8.

Immediately upon release of the latching mechanism, the pressure motor 70 may be returned to its initial condition to thereby bring the lever 64 into engagement with the latching pin 62 under the bias of the spring 66, the latching pin 62 riding along the top surface of the lever 64 as the gear 58 and latching lever 60 are swung about the axis of the trunnion 24.

Figures 9, 10:
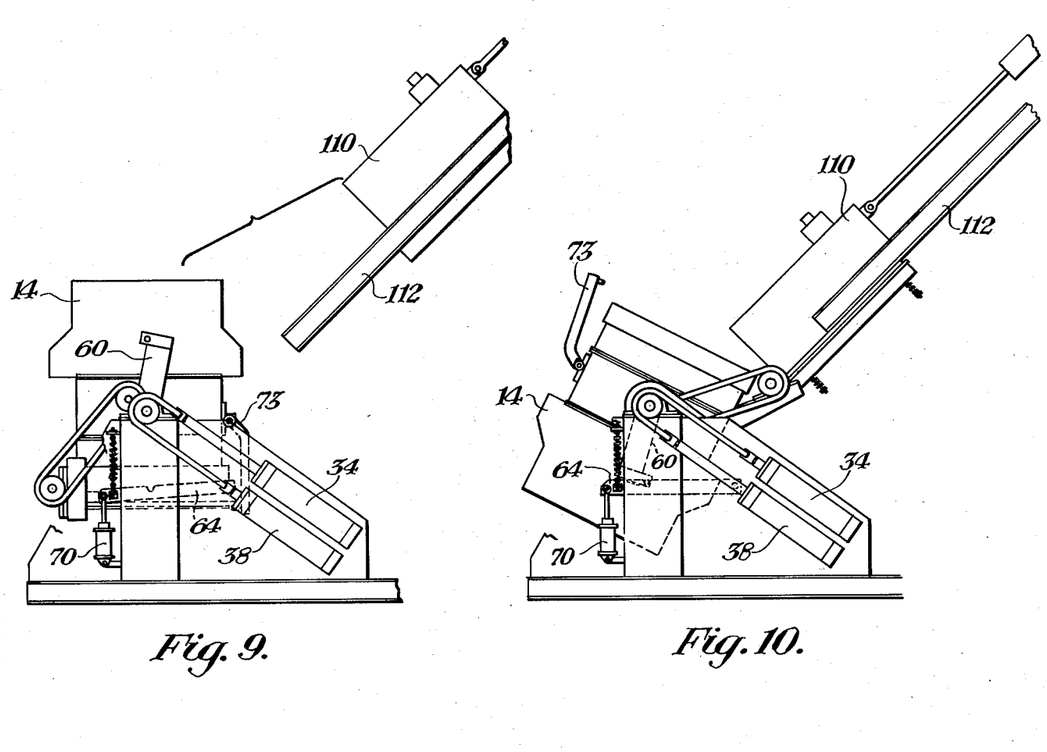
Fig. 9 is a side elevation showing the pattern holder and hopper in an inverted position subsequent to the exhaustion of fluid pressure from the tubular gate to the hopper.
Fig. 10 is a side elevation showing the pattern holder disengaged from the hopper preparatory to moving of the pattern holder relatively to the oven.

Counterclockwise rotation of the hopper 14 then continues, moving the hopper 14 through the true vertical position, as shown in Figs. 6 and 9, wherein the pattern plate 42 is directly beneath the hopper and terminating at a limit position wherein the hopper 14 is inclined to the vertical at an angle substantially equal to the angle of repose of the mold forming material. This angle is substantially 45 degrees for a molding material comprising sand and synthetic resin mixture and it is to be noted that the proportions of the piston rods 32, 36 and drive chain 30 are selected to assure location of the hopper in this limit position. When the hopper 14 is located in such a limit position, the molding material therein will cascade onto the surface of the gate 74 and distribute itself substantially uniformly thereon as shown in Fig. 6. The fluid pressure motors 34, 38 are then reversed to rotate the hopper 14 in a clockwise direction, as viewed in Figs. 1 and 7–10, to place the same in a true vertical position with the pattern 42 positioned immediately beneath the open end 20 thereof as shown in Fig. 9.

The manifolds 86 are then disconnected from the source of fluid pressure and connected to a vacuum to cause collapse of the tubular elements 78 of the gate 74 thereby creating a plurality of parallel apertures through which the molding material may fall, through the screen 92 which is vibrated at this time, onto the pattern plate 42.

After the molding material has remained on the pattern 42 for a sufficient length of time to form a shell of the required thickness, the motors 34, 38 are again operated to rotate the hopper 14 in a clockwise direction as viewed in Fig. 1. As the hopper 14 approaches the vertical position, with the open end 20 thereof extending upward, the clamping arms 73 are cammed out of engagement with the pattern support frame 40 by engagement of the cam follower 81 with the cam 83. The latching pin 62, substantially simultaneously with the unclamping operation, drops into the notch 68 of the lever 64 to latch the gear 58, causing the same to resume its role as sun gear of the planetary gearing. Further clockwise rotation of the hopper 14 will then result in torque being transmitted to the shaft 44 to rotate the pattern support frame 40 and pattern 42 out of engagement with the open end 20 of the hopper 14.

The last described rotation of the hopper 14 causes the excess molding material to fall back, through the screen 92 and gate 74, to the bottom of the hopper 14.

Rotation of the hopper 14 is terminated when the pattern support frame 40 is positioned adjacent and slightly below the rails 112 of the oven means 18 and the fluid pressure motor 116 is then actuated to slide the oven housing 110 over the pattern support frame 40. The hopper 14 is then rotated slightly in a counterclockwise direction to bring the pattern plate 42 into engagement with the open end of the oven housing 110 as shown in Fig. 10 where it is retained for a period sufficiently long to complete curing of the molding material disposed thereon. The hopper 14 is then rotated slightly in a clockwise direction to move the pattern plate 42 out of engagement with the oven housing 110. The oven housing 110 is then returned to its initial position by operation of the motor 116.

The hopper 14 is then rotated further in a clockwise direction, as viewed in Fig. 1, until it is inclined to the vertical at an angle of approximately 45 degrees, i. e. the position shown in Fig. 1. Movement of the hopper 14 to such position will cause rotation of the pattern support frame 40 to a position immediately above the ejector mechanism 16 and in engagement with the abutment 124 where it is secured by the clamp 125. The fluid pressure motor 120 is then operated to raise the plate 118 and force the ejector pins 122 into engagement with the finished mold, thereby ejecting the same from the pattern 42.

As the hopper 14 moves toward the final ejection position shown in Fig. 1, the roller 102 is moved into engagement with the abutment 106 to cause the door 96 to be swung open against the bias of the spring 100. Thus, in this final position of the hopper, the door 96 is positioned as shown in Fig. 5 and the port 94 is open to permit solids (such as agglomerated pieces of molding material which were rejected by the screen 92 as the molding material returned to the lower end of the hopper 14 upon return rotation thereof) to slide off the screen 92 and out of the hopper 14 through the port 94. The screen 92 is preferably vibrated at this time to facilitate removal of the solids. Thus, no lumps of molding material are reused and the supply of molding material is maintained in a finely divided state. It is to be noted that initial rotation of the hopper 14 at the start of another mold making cycle will move the roller 102 out of engagement with the abutment 106 and permit the spring 100 to close the swinging door 96.

The rotational movement caused by fluid pressure motors 34 and 38 during each cycle of operation results in rotational movement of hopper 14 first in a counter clockwise direction and then in a clockwise direction. In effect, during each cycle of operation the hopper 14 is oscillated about the pivot point formed by trunnions 24 and 25.

The manifolds 86 of the gate 74 may then be disconnected from the vacuum and placed in communication with the source of fluid pressure to expand the tubular elements 78 and close the gate 74. The apparatus is then in condition for the start of another mold making cycle.

Although the disclosed embodiment of this invention has been described in considerable detail, it is to be understood that such description is intended as illustrative rather than limiting as the invention may be variously embodied and it is to be interpreted as claimed.

It is claimed and desired to secure by Letters Patent:

1. Mold forming apparatus comprising support means, a hopper for mold forming material pivotally mounted on said support means and having a discharge opening at one end thereof, means for oscillating said hopper about said pivot through a predetermined range of angular positions, pattern support means pivotally mounted on the hopper to swing into and out of engagement with said one end as the hopper oscillates, actuating means for moving said pattern support means relative to said hopper to swing it into and out of engagement with the hopper while said hopper is moving through one portion of said range, said actuating means for the pattern support being responsive to the means for oscillating the hopper, and means for rendering said actuating means ineffective while said hopper is moving through another portion of said range.

2. Mold forming apparatus comprising support means, a hopper for mold forming material pivotally mounted on said support means and having a discharge opening at one end thereof, means for oscillating said hopper through a range of angular positions, pattern support means pivotally mounted on the hopper to swing into and out of engagement with said one end as the hopper oscillates, actuating means for moving said pattern support means relative to said hopper into and out of engagement with said one end, means operative for driving said actuating means in response to movement of said hopper, said actuating means for the pattern support being responsive to the means for oscillating the hopper, and means adapted to cause operation of said last named means only while said hopper is moving through a predetermined portion of said range.

3. Mold forming apparatus comprising support means, a hopper for mold forming material pivotally mounted on said support means and having a discharge opening at one end thereof, means for oscillating said hopper through a range of angular positions, pattern support means pivotally mounted on the hopper to swing into and out of engagement with said one end as the hopper oscillates, actuating means including gearing for moving said pattern support means to move the same into and out of engagement with said one end, and means for selectively establishing a power transmitting connection between said hopper and said gearing, whereby said actuating means for the pattern support is responsive to the means for oscillating the hopper.

4. Mold forming apparatus as claimed in claim 3 wherein means is provided for terminating said power transmitting connection upon movement of said hopper to a predetermined position.

5. Mold forming apparatus as claimed in claim 3 wherein said gearing is adapted to move said pattern support means at an angular velocity greater than the angular velocity of said hopper.

6. Mold forming apparatus comprising support means, a hopper for mold forming material pivotally mounted on said support means and having a discharge opening at one end thereof, means for oscillating said hopper through a range of angular positions, pattern support means pivotally mounted on the hopper to swing into and out of engagement with said one end as the hopper oscillates, actuating means for moving said pattern support means into and out of operative engagement with said one end, said actuating means including a planetary gear train having a sun gear and gear means operatively connected to said pattern support means and said sun gear, said gear means being bodily movable with said hopper, latching means for preventing rotation of said sun gear, and means for releasing said latching means to permit rotation of said sun gear while said hopper is in a selected portion of said range, said actuating means for the pattern support being responsive to the means for oscillating the hopper.

7. Mold forming apparatus as claimed in claim 6 wherein said gear train is adapted to rotate said pattern support means at a speed greater than the rotational speed of said hopper to establish said operative engagement while said hopper is within a portion of said range wherein said discharge opening extends substantially upward.

8. Mold forming apparatus comprising support means, a hopper for mold forming material pivotally mounted on said support means and having a discharge opening therein, said discharge opening being at the top of said hopper in a first position thereof, pattern support means operatively engageable with said hopper for positioning a pattern over said discharge opening, screen means within said hopper and extending transversely thereof, a port in a side wall of said hopper adjacent said screen means, closure means for said port movable between open and closed positions, means for rotating said hopper to a second position wherein said pattern support means is positioned beneath said hopper for depositing mold forming material on a pattern carried by said pattern support means, and means for moving said closure means to said open position in response to movement of said hopper to a third position.

9. Mold forming apparatus as claimed in claim 8 wherein the axis of said hopper is inclined to the vertical when said hopper is in said third position.

10. Mold forming apparatus comprising a rotatable hopper for mold forming material having a discharge opening therein, pattern support means operatively engageable with said hopper for positioning a pattern over said discharge opening, screen means within said hopper and extending transversely thereof, a port in a side wall of said hopper adjacent said screen means and positioned to provide a passage for solids trapped by said screen, closure means for said port having open and closed positions, and means for moving said closure means between said positions.

11. In combination with a container having side walls, gate means comprising a plurality of tubular expansible and collapsible elements traversing the interior of said container and spaced from each other and said side walls, and means for connecting the interiors of said elements with a source of fluid under pressure to cause said elements to expand sufficiently to contact each other and said side walls to form a substantially imperforate transverse wall across the interior of said container.

12. In combination with a container having side walls, gate means comprising a plurality of spaced, relatively rigid, members extending across the interior of said container supported on opposite side walls and spaced from adjacent walls thereof, a plurality of tubular expansible and collapsible elements respectively encompassing said members, and means for connecting the interiors of said elements with a source of fluid under pressure to cause said elements to expand sufficiently to contact each other and said adjacent walls to form a substantially imperforate transverse wall across the interior of said container.

13. Mold forming apparatus comprising, a source of mold forming material, pattern means, means defining an enclosed passage communicating with said source and said pattern means and providing a path for mold forming material, and exhaust means communicating with said passage adjacent said pattern means for removing air therefrom as mold forming material in said passage approaches said pattern means.

References Cited in the file of this patent

UNITED STATES PATENTS

| | | |
|---|---|---|
| 2,630,608 | Granath | Mar. 10, 1953 |
| 2,659,944 | Valyi | Nov. 24, 1953 |
| 2,659,945 | Valyi | Nov. 24, 1953 |
| 2,702,133 | Kilpatrick | Feb. 15, 1955 |
| 2,724,879 | Fischer | Nov. 29, 1955 |
| 2,728,963 | Rynerson et al. | Jan. 3, 1956 |
| 2,733,489 | Dahmer | Feb. 7, 1956 |
| 2,741,005 | Hurst | Apr. 10, 1956 |
| 2,762,092 | Klamp et al. | Sept. 11, 1956 |

FOREIGN PATENTS

| | | |
|---|---|---|
| 832,936 | Germany | Mar. 3, 1952 |
| 1,059,189 | France | Nov. 10, 1953 |